US010719544B2

(12) United States Patent
Subramanian et al.

(10) Patent No.: US 10,719,544 B2
(45) Date of Patent: Jul. 21, 2020

(54) PROVIDING MEDIA CONTENT BASED ON USER STATE DETECTION (71) Applicant: DISH Technologies L.L.C., Englewood, CO (US)

(72) Inventors: Prakash Subramanian, Littleton, CO (US); Nicholas Brandon Newell, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 16/296,970

(22) Filed: Mar. 8, 2019

(65) Prior Publication Data

US 2019/0205329 A1 Jul. 4, 2019

Related U.S. Application Data (63) Continuation of application No. 15/008,543, filed on Jan. 28, 2016, now Pat. No. 10,268,689.

(51) Int. Cl.
*G06F 16/435* (2019.01)
*H04L 29/08* (2006.01)
*G06Q 30/02* (2012.01)
*H04L 29/06* (2006.01)
*G06F 16/438* (2019.01)

(52) U.S. Cl.
CPC ........ *G06F 16/436* (2019.01); *G06F 16/4393* (2019.01); *G06Q 30/02* (2013.01); *G06Q 30/0269* (2013.01); *H04L 65/1089* (2013.01); *H04L 67/06* (2013.01); *H04L 67/22* (2013.01)

(58) Field of Classification Search
CPC ............... G06Q 30/0269; G06Q 30/02; H04L 65/1089; H04L 67/06; H04L 67/22; G06F 16/436; G06F 16/4393
See application file for complete search history.

(56) References Cited

U.S. PATENT DOCUMENTS

| 4,870,579 | A  | 9/1989  | Hey            |
| 6,321,221 | B1 | 11/2001 | Bieganski      |
| 6,774,926 | B1 | 8/2004  | Ellis et al.   |
| 6,978,470 | B2 | 12/2005 | Swix           |
| 7,958,525 | B2 | 6/2011  | Karaoguz et al.|

(Continued)

FOREIGN PATENT DOCUMENTS

CN 104038836 A 9/2014

OTHER PUBLICATIONS

Sato et al., "Recommender System by Grasping Individual Preference and Influence from other users," 2013 IEEE/ACM International Conference on Advances in Social Networks Analysis and Mining (ASONAM'13), ACM, 2013, pp. 1345-1351.

(Continued)

*Primary Examiner* — Kyung H Shin
(74) *Attorney, Agent, or Firm* — Kilpatrick Townsend & Stockton LLP (57) ABSTRACT

A system includes a computing device including a processor programmed to receive data identifying a mental state of a user, the data including at least one of a user physical condition and a user communication. Based on the mental state data, the processor is programmed to assign one or more stored keywords to the user, and provide media content to the user based on the keywords assigned to the user based on the mental state data.

21 Claims, 4 Drawing Sheets

(56) References Cited

U.S. PATENT DOCUMENTS

| | | |
|---|---|---|
| 8,180,804 B1 | 5/2012 | Narayanan |
| 8,195,460 B2 | 6/2012 | Degani et al. |
| 8,327,395 B2 | 12/2012 | Lee et al. |
| 8,332,883 B2 | 12/2012 | Lee et al. |
| 8,561,095 B2 | 10/2013 | Dimitrova et al. |
| 8,589,968 B2 | 11/2013 | Alberth et al. |
| 8,654,952 B2 | 2/2014 | Wang et al. |
| 8,682,666 B2 | 3/2014 | Degani et al. |
| 8,768,744 B2 | 7/2014 | Narasimhan et al. |
| 8,782,681 B2 | 7/2014 | Lee et al. |
| 8,849,199 B2 | 9/2014 | Shrum, Jr. et al. |
| 8,849,649 B2 | 9/2014 | Duong-van |
| 8,973,022 B2 | 3/2015 | Lee et al. |
| 9,009,024 B2 | 4/2015 | Zhang et al. |
| 9,026,476 B2 | 5/2015 | Bist |
| 9,306,989 B1 | 4/2016 | Jayaram |
| 9,338,493 B2 | 5/2016 | Van Os et al. |
| 9,454,519 B1 | 9/2016 | Keysers et al. |
| 9,679,570 B1 | 6/2017 | Edara |
| 9,712,587 B1* | 7/2017 | Alfishawi .......... G06Q 30/0269 |
| 9,832,619 B2 | 11/2017 | Cho |
| 2003/0063222 A1 | 4/2003 | Creed et al. |
| 2004/0001616 A1 | 1/2004 | Gutta |
| 2005/0132401 A1 | 6/2005 | Boccon-Gibod et al. |
| 2005/0144064 A1 | 6/2005 | Calabria et al. |
| 2006/0159109 A1 | 7/2006 | Lamkin |
| 2007/0288987 A1 | 12/2007 | Kim et al. |
| 2008/0046917 A1 | 2/2008 | de Heer |
| 2009/0030792 A1 | 1/2009 | Khivesara et al. |
| 2009/0144075 A1 | 6/2009 | Flinn et al. |
| 2009/0234727 A1 | 9/2009 | Petty |
| 2010/0114937 A1* | 5/2010 | Hawthorne ............ G06Q 30/02 707/769 |
| 2010/0138416 A1* | 6/2010 | Bellotti ............... G06F 16/4393 707/736 |
| 2010/0324992 A1 | 12/2010 | Birch |
| 2011/0238495 A1 | 9/2011 | Kang |
| 2011/0282947 A1 | 11/2011 | Dodson |
| 2011/0320471 A1 | 12/2011 | Hiroi et al. |
| 2012/0005224 A1 | 1/2012 | Ahrens |
| 2012/0266191 A1 | 10/2012 | Abrahamsson et al. |
| 2012/0311618 A1 | 12/2012 | Blaxland |
| 2013/0145385 A1 | 6/2013 | Aghajanyan et al. |
| 2013/0297638 A1 | 11/2013 | Hein |
| 2014/0036022 A1 | 2/2014 | Croen et al. |
| 2014/0067953 A1 | 3/2014 | Weinstein |
| 2014/0088952 A1 | 3/2014 | Fife et al. |
| 2014/0089801 A1 | 3/2014 | Agrawal |
| 2014/0108142 A1 | 4/2014 | Toebes et al. |
| 2014/0173653 A1 | 6/2014 | Waibel et al. |
| 2014/0188997 A1 | 7/2014 | Schneiderman et al. |
| 2014/0195328 A1 | 7/2014 | Ferens et al. |
| 2014/0201125 A1 | 7/2014 | Moeinifar et al. |
| 2014/0244636 A1 | 8/2014 | Mickelsen |
| 2014/0255002 A1 | 9/2014 | Baldwin et al. |
| 2014/0279751 A1 | 9/2014 | Ram et al. |
| 2014/0337427 A1 | 11/2014 | Hamada et al. |
| 2014/0344039 A1 | 11/2014 | Kowalczyk |
| 2014/0365349 A1 | 12/2014 | Kennon |
| 2015/0020086 A1 | 1/2015 | Chen |
| 2015/0026706 A1 | 1/2015 | Leamon |
| 2015/0039549 A1 | 2/2015 | Aufmann |
| 2015/0112918 A1 | 4/2015 | Zheng et al. |
| 2015/0294221 A1 | 10/2015 | Gutierrez et al. |
| 2016/0034970 A1 | 2/2016 | Musil |
| 2016/0147767 A1 | 5/2016 | Manning et al. |
| 2016/0239547 A1 | 8/2016 | Lim et al. |
| 2016/0259797 A1 | 9/2016 | Lewis et al. |
| 2016/0277787 A1 | 9/2016 | Kobayashi et al. |
| 2017/0048184 A1 | 2/2017 | Lewis et al. |
| 2017/0134803 A1 | 5/2017 | Shaw |
| 2017/0169726 A1 | 6/2017 | Aguirre |
| 2017/0322947 A1 | 11/2017 | Subramanian |
| 2017/0339467 A1 | 11/2017 | Patel et al. |
| 2017/0366861 A1 | 12/2017 | Chung |
| 2018/0040019 A1 | 2/2018 | Gavlovski et al. |

OTHER PUBLICATIONS

Kompan et al., "Context-based Satisfaction Modelling for Personalized Recommendations," 8th International Workshop on Semantic and Social Media Adaptation and Personalization, IEEE, 2013, pp. 33-38.

Bublitz et al., "Using Statistical Data for Context Sensitive Pervasive Advertising," IEEE, 2014, pp. 41-44.

Hong et al., "A Comparative Study of Video Recommender Systems in Big Data Era," IEEE, 2016, pp. 125-127.

Mao et al., "Multirelational Social Recommendations via Multigraph Ranking," IEEE, 2016, pp. 1-13.

* cited by examiner

PROVIDING MEDIA CONTENT BASED ON USER STATE DETECTION

CROSS-REFERENCE TO RELATED APPLICATIONS

This patent application is a continuation of and claims priority to and all advantages of U.S. patent application Ser. No. 15/008,543 filed on Jan. 28, 2016, which is herein incorporated by reference in its entirety.

BACKGROUND

Users of media content lack mechanisms for selecting appropriate items of media content, e.g., programming that may include movies, sports, live events, etc. For example, present media content delivery devices (e.g., set-top boxes and the like, are lacking in the ability to detect various user attributes, e.g., to interpret data indicating a user's mental state and events.

DETAILED DESCRIPTION

Exemplary System

A user device computer, with authorization from the user, collects data that can be used to predict a user's mental state. For example, collected data may indicate a user's mental state by providing values for attributes such as a user's physical condition, recent events affecting a user (sometimes referred to as a user's "personal circumstances" or "situation"), events possibly affecting a user's mental state, etc. Physical condition data that can be used to determine a mental state can include, for example voice samples, facial expressions, biometric data (respiration, heartrate, body temperature, etc.), etc. Situation data may be collected related to events (received promotion, had a child, bought a new home, etc.), locations (at work, in Hawaii, in a bar, in the living room, etc.), demographic characteristics (age, gender, religion, marital status, financial circumstances, etc.), company (people user is with, their gender, age, relationship, etc.) time (date, day of the week, time of day, user's birthday, holiday) and any other information that may be used to understand the current situation of the user. Sources for collected data indicating a user's mental state may include communications (emails, texts, conversations, etc.), documents (tax returns, income statements, etc.), global positioning (GPS) data, calendar data (past, present and future events), internet browsing history, mobile purchases, input provided by the user, etc.

The user device computer is typically is programmed to provide the collected data to a server of a media content provider. The media server can store and maintain the data about the user. Based on the stored collected data, the media content provider computer is programmed to assign one or more predetermined keywords describing the user's situation and one or more predetermined keywords describing the user's mood. Predetermined keywords to describe a user's situation may include, e.g., "inspirational," "comedy," "jim-carrey," "family vacation," "goofy," "grief," etc. Predetermined keywords to describe a user's mood may include, e.g., "happy," "sad," "excited," "bored," "frustrated," "relaxed," etc.

The media server is programmed to generate and provide to the user a set of the assigned keywords. For example, the set of assigned keywords may include two predetermined keywords selected according to a user situation or situations and one predetermined keyword selected according to one or more detected user physical conditions. The media provider computer may provide the set of assigned keywords, e.g., in response to a request from the user, or for example, on a regular basis (e.g., once per hour), or for example, based on the location of the user (when the user arrives at home, arrives in the living room, etc.).

As described in additional detail below, the user may identify, and request a media content item which is provided by the media provider for selection according to a current predicted user mental state, e.g., based on a user's situation, physical condition(s), etc., based on the set of assigned keywords. The user may send the request to the media content provider computer, either via the user device or via a media device available to the user. The media content provider may then provide the requested media content to the user via, e.g., the user device or the media device.

Figure 1:
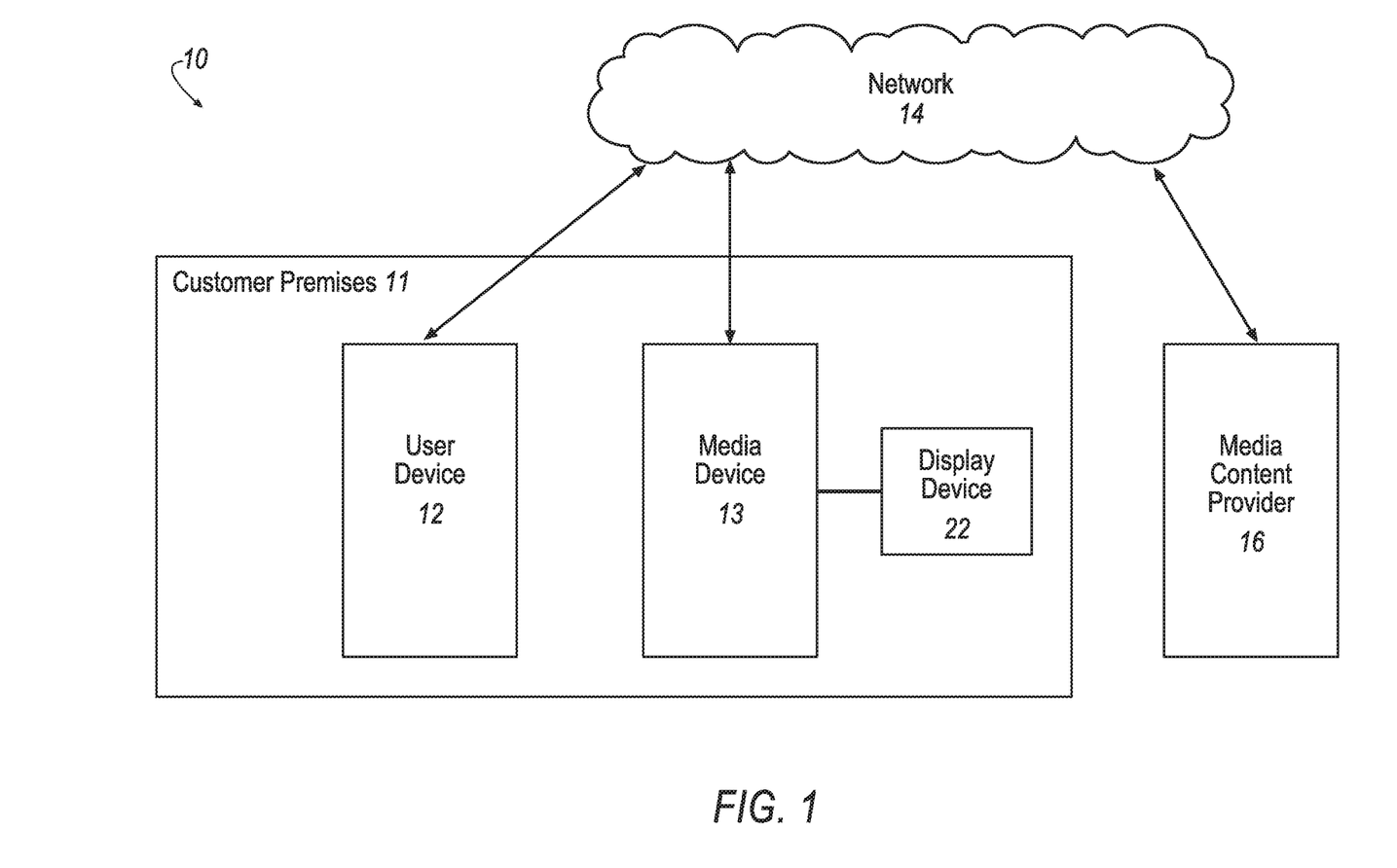
FIG. 1 is a diagram of an exemplary media system for providing media content based on user state detection.

As shown in FIG. 1, an exemplary media system 10 includes one or more user devices 12, one or more media devices 13, a network 14, and a media server 16. The media device 13 may be communicatively coupled to a display device 22. The user device 12, media device 13 and display device 22 may be included in a customer premises 11.

A user may be a consumer of media content who provides access to various user data by the media system 10. Generally, the user operates a user device 12 which collects some or all of the data related to the user, and provides the data to the media server 16. The server 16 may be provided by a media content provider such as are known, e.g., a cable or satellite media provider, an internet site, etc.

As described in additional detail below, the user device 12, data collectors associated with the user device 12, and/or other data collectors communicatively coupled to the user device 12, media device 13 or media server 16, may collect data regarding the user and provide the collected data to the media server 16. Based on the collected data, a media server 16 may assign to the user one or more keywords describing a user mental state, e.g., based on a mood of the user indicated by collected data concerning physical attributes of the user, and/or one or more keywords describing a situation of the user indicated by data collected from documentation concerning the user, e.g., from an audio conversation, e-mail, text messages, calendar entries, etc. Further, based on the keywords associated with the user, the media server 16 may recommend or provide one or more items of media content to the user via, e.g., the media device 13.

The user device 12 may be a known device such as a mobile telephone, tablet, smart wearable (smart watch, fitness band, etc.), other portable computing device, etc. As described in additional detail below, the user device 12 may include one or more applications such as email, a calendar, web browser, social media interfaces, etc., and one or more data collectors such as a video camera, biometric sensors, a global positioning system, etc. The user device 12 may additionally include an application for collecting data related to the user from the one or more applications and one or more data collectors, and providing the collected data to the media server 16 computer or to another computing device.

The media device 13 receives and displays media content, and is typically a known device such as a set-top box, a laptop, desktop, tablet computer, game box, etc. The term "media content" as used herein, refers to digital audio and/or video data received in the user device 12 computer and/or in the media device 13. The media content may be received, for example, from the media server 16 via the network 14.

The media device 13 is connected to or could include a display device 22. The display device 22 may be, for example, a television receiver, a monitor, a desktop computer, a laptop computer, a tablet, a mobile telephone, etc. The display device 22 may include one or more displays and one or more speakers for outputting respectively the video and audio portions of media content and advertisement content received from the media device 13.

The network 14 represents one or more mechanisms for providing communications, including the transfer of media content items, between the user device 12, media device 13, and the media server 16. Accordingly, the network 14 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

The media server 16 may be, for example, a known computing device included in one or more of a cable or satellite television headend, a video streaming service such as generally includes a multimedia web server (or some other computing device), etc. The media server 16 may provide media content, e.g., a movie, live event, audio, to the user device 12 and/or media device 13.

The media content is typically delivered as compressed audio and/or video data. For example, the data may be formatted according to known standards such as MPEG or H.264. MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided to a media device 13 in a format such as the MPEG-1, MPEG-2 or the H.264/MPEG-4 Advanced Video Coating standards (AVC) (H.264 and MPEG-4 at present being consistent) and HEVC/H.265. As is known, MPEG and H.264 data include metadata, audio, and video components. Further, media content and advertisement content in the media system 10 could alternatively or additionally be provided according to some other standard or standards. For example, media content and advertisement content could be audio data formatted according to standards such as MPEG-2 Audio Layer III (MP3), Advanced Audio Coding (AAC), etc.

Figure 2:
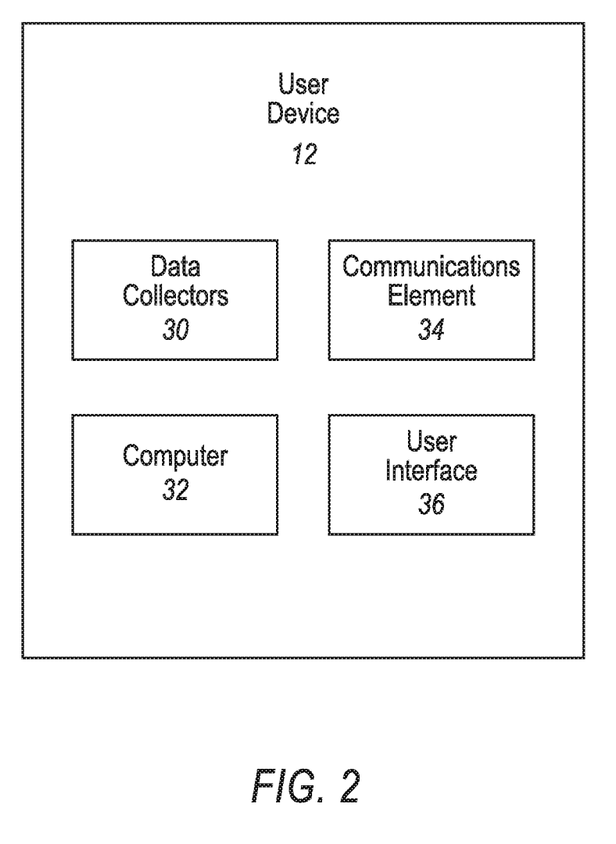
FIG. 2 is a diagram of an exemplary user device for the media system of FIG. 1.

As shown in FIG. 2, the user device 12 includes a computer 32, a communications element 34 and a user interface 36. Additionally, the user device 12 may include and/or be communicatively coupled, e.g., in a known manner, with one or more data collectors 30.

The data collectors 30 may include, for example cameras, microphones, biometric sensors, accelerometers, gyroscopes, a global positioning system and other types of sensors for collecting data regarding the respective user of the user device 12. The data collectors 30 are communicatively coupled to the computer 32, and may be included in or remote to the user device 12.

The data collectors 30 may be used to collect data related to the user and other people and objects proximate to the user device 12. Proximate to the user device 12 may be defined, for example, to be within a detection range of a respective sensor, within a same room as the user device 12, or within a fixed distance, for example 20 meters, of the user device 12. As discussed below, the computer 32 may be authorized to collect data via the data collectors 30 at any time, or based on conditions established, for example, by the user of the user device 12.

For example, a microphone in the user device 12 may listen, on a substantially continuous basis, to the surroundings, and record conversations and other received sounds and provide audio data to the computer 32. The computer 32 may determine whether the received data may be useful in determining a situation and/or mood of the user. The computer 32 may store data determined to be useful in determining a situation and/or mood of the user and discard data which is determined not to be useful in determining a situation and/or mood of the user. For example, the content of a conversation that includes only an exchange of greetings and small talk may be discarded, whereas the tone quality of the same conversation may be determined to be indicative of mood, and may be stored.

The data collectors 30 may further be used to collect biometric data related to the user. For example, the data collectors 30 may measure the user's blood pressure, heartrate, body temperature, etc.

The communications element 34 may include hardware, software, firmware, etc., such as are known, and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc. for converting messages from one protocol to another protocol. Some functions, e.g., encoding functions, may be realized via firmware.

The types of wireless communications may include cellular communications, WiFi communications, two-way satellite communications (e.g., emergency services), one way satellite communications (e.g., receiving digital audio radio broadcasts), AM/FM radio, etc.

The user interface 36 may include one or more input elements such as buttons, a key board, a touchscreen, a microphone, a touchpad etc. for receiving input from a user. The user interface 36 may further include one or more display elements such as an LCD display, speaker, light emitting diodes, buzzers, etc. for outputting data to the user.

The computer 32 includes a memory, and one or more processors, the memory storing program code, i.e., computer-executable instructions, executable by the processor. The computer 32 is operable to receive input from a user and transmit the input to another computing device such as the media device 13 or the media server 16. The computer 32 further may include one or more applications such as are known for email, a calendar, texting, social media interfaces, web browsers, etc., and may send data to and receive data from remote computers, including without limitation the media server 16, for such applications.

Additionally, the computer 32 is programmed to collect data related to the user and provide the collected data to another computing device such as the media server 16. The data may be collected from other applications installed on the computer 32, or from the data collectors 30. The collected data may include, e.g., data which may be useful for determining the mood and the situation of the user. For example, the collected data may include words or phrases parsed from documents or files, e.g., from monitoring or recording voice communications, parsing e-mails, text messages, calendar entries, etc. Alternatively or additionally, the collected data could include data concerning current physical attributes of a user, e.g., heartrate, respiration, skin color, body temperature, etc.

Figure 3:
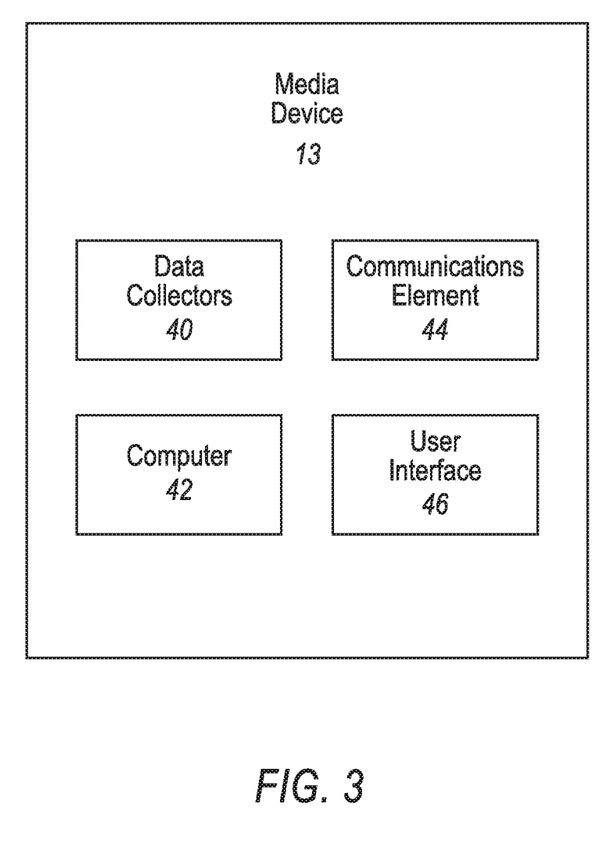
FIG. 3 is a diagram of an exemplary media device for the media system of FIG. 1.

As shown in FIG. 3, the media device 13 includes a computer 42, a communications element 44, and a user interface 46. The media device 13 may further include one or more data collectors 40. The computer 42 is communicatively coupled with each of the data collectors 40, communications element 44 and user interface 46.

The data collectors 40 may include, for example cameras, microphones, motion detectors, infrared sensors, ultrasonic sensors, and other types of sensors for collecting data regarding users proximate to the media device 13. Proximate to the media device 13 may be defined, e.g., as within a range to be detected by the data collectors 40. As other examples, proximate to the media device 13 may be defined to be within a fixed distance, e.g., 20 meters, of the media device 13, within a range to view a display device 22 included in the media device 13, within a room including the media device 13, etc.

The data collectors 40 are communicatively coupled to the computer 42, and may be included in or remote to the media device 13. The data collectors 40 may be used to collect visual data, audio data, motion data, biometric data, etc. related to one or more users proximate to (e.g., in a room with and/or within a predetermined distance of) the media device 13.

The communications element 44 may include hardware, software, firmware, etc., such as are known, and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc. for converting messages from one protocol to another protocol. Some functions, e.g., encoding functions, may be realized via firmware.

The types of wireless communications may include cellular communications, WiFi communications, two-way satellite communications (e.g., emergency services), one way satellite communications (e.g., receiving digital audio radio broadcasts), AM/FM radio, etc.

The user interface 46 may include one or more input elements such as buttons, a key board, a touchscreen, a roller ball, a touchscreen, a mouse, a microphone, switches, etc. for receiving input from a user. The user interface 46 may further include one or more display elements such as an LCD display, plasma display, speaker, lamps, light emitting diodes, buzzers, etc. for outputting data to the one or more users.

The computer 42 includes a memory, and one or more processors, the memory storing program code, i.e., computer-executable instructions, executable by the processor.

The computer 42 is operable to receive media content from the media server 16 and display received media content on the display device 22.

Additionally, the computer 42 is may be programmed to collect data regarding the users proximate to the media device 13. The data may be collected, via, e.g., the data collectors 40. The collected data may include, e.g., data which may be useful for determining the mood and the situation of the user.

The media server 16 may provide media content to the user device 12 and/or media device 13. The media server 16 may include one or more processors and memories as is known, as well as known mechanisms for communicating via the network 14.

The memory of the server 16 can store program code, i.e., computer-executable instructions, executable by the processor. The server 16 is programmed to provide media content to the user device 12 and/or media device 13, via the network 14.

Additionally, the server 16 may be programmed to receive data related to the situation and mood of the user. Based on the data, and as described in additional detail below, the server 16 may be programmed to assign one or more predetermined keywords describing the user's situation and/or one or more predetermined keywords describing the user's mood to the user. The server 16 may further be programmed to provide the keywords to the user. The server 16 may yet further be programmed to provide one or more media content items to the user based on the assigned keywords. In some cases the server 16 may recommend one or more media content items to the user based on the assigned keywords to the user, e.g., via the user device 12. The server 16 may then receive a request for a media content item selected by the user from the one or more recommended media content items, and provide the media content to the user based on the request.

The communications element 54 may include hardware, software, firmware, etc., such as are known, and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc. for converting messages from one protocol to another protocol. Some functions, e.g., encoding functions, may be realized via firmware.

The communications element may be programmed to transmit and receive media content, e.g., via satellite and/or wired (cable) communications. Additionally, the communications element may be programmed for wireless communications such as cellular communications and WiFi communications.

Processes

Collecting User Data

As described above, the device 12 computer 32 may collect various types of data related to the user. The collected data may be categorized, e.g., as mood data and situation data.

Mood data may include, e.g., audio data and body data. The audio data may include, e.g., voice samples from the user. The body data may include visual data of the user, e.g., (facial expression, posture, etc.) and biometric data (heart rate, blood pressure, body temperature, pupil dilation, etc.)

Situation data may be collected related to events (received a promotion, bought a new home, birth of a child, etc.), locations (at work, in Hawaii, in a bar, in the living room, etc.), circumstances (age, gender, religion, marital status, financial circumstances, etc.), company (people user is with, their gender, age, relationship, etc.) time (date, day of the week, time of day, user's birthday, holiday) and other information that may be used to understand the situation of the user.

The computer 32 may collect the data via data collectors 30 included in or communicatively coupled to the computer 32. For example, the computer 32 may receive audio data. The computer 32 may detect, for example, when the user is speaking with another person, and record the speech. Additionally or alternatively, the computer 32 may, for example, when the user indicates that the user would like to select a media content item, engage the user in conversation. For example, the computer 32 may ask the user "What is your current mood?" or "How are you feeling today?" The computer 32 may collect samples of speech for use to analyze the mood and/or situation of the user.

The computer 32 may further collect visual data from the data collectors 30. The data collectors 30 may include one or more cameras included in or communicatively coupled to the computer 32. The cameras may collect visual data related to the user facial expressions, related to the user's posture, etc. The cameras may further collect data indicating, for example, a degree of dilation of the user's pupils, a degree of coloration of the skin (for example, blushing), etc.

Still further, the data collectors 30 may include sensors for measuring blood pressure, pulse, body temperature, etc. of the user.

The data collectors 30 may still further be used to collect situational data related to the user. For example, an audio data collector (microphone) 30 may detect the voices of other people in conversation with or otherwise proximate to the user. A camera 30 may receive images of people proximate to the user, or of the environment of the user.

In addition to collecting data via the data collectors 30, the computer 32 may collect data related to the user from other sources. The data sources may include communications (emails, texts, conversations, etc.), documents (tax returns, income statements, etc.), global positioning data (GPS), calendar or other scheduling application (past, present and future appointments, events, etc.), internet browsing history, mobile purchases, input provided by the user, etc.

A time stamp may be associated with some or all of the data. For example, when collecting a voice sample, the computer 32 may note the time that the voice sample was collected, and store the time along with the voice sample. In this way, data such as voice data may by correlated in time to other data such as biometric data or visual data related to the user.

Similarly, a date and time that a communication was sent may be extracted from the communication and stored with the data extracted from a text of the email. In this manner, a time can be associated with a text of the communication. For example, an email from a user complaining about a decision by a colleague may be associated with a time of the communication.

In addition to monitoring the user, the user's surroundings, the user's communications, etc., the computer 32 may collect data from the user interactively. For example, the computer 32 may (e.g., via a speech program) ask the user how the user is feeling today, or how the user's day is going. The computer 32 may record the user's response and use the recorded response as a voice sample.

The computer 32 may provide the data to, for example, the media provider 16 server 16, which may use the data to determine the user's mood and situation. Based on the determined mood and situation of the user, the media provider 16 server 16 (or other computing device) may assign one or more keywords to the user, indicating the mood and situation of the user.

Evaluating User Data

The media provide 16 server 16 may, as indicated above, determine the user's mood based on the collected data. For example, the server 16 may evaluate voice data and body data related to the user.

Voice Data:

The user device 12 computer 32 may collect voice samples related to the user. For example, as described above, a microphone 30 may be activated while the user is conducting conversations with other people, and the computer 32 may collect one or more samples of the user's voice. As another example, when, for example, the user indicates that the user would like to select an item of media content for viewing, the computer 32 may engage the user in conversation. The computer 32 may ask questions of the user such as "What is your mood at the moment?" or "How has your day gone?" The computer 32 may collect the responses as current samples of the user's voice. The computer 32 may provide the collected data to, e.g., the media provider 16 server 16, which may analyze the voice samples to determine the user's mood.

The server 16 may, e.g., analyze the voice samples for qualities such as tone, volume, voice inflection, pitch, speed, contrast, etc. The server 16 may compare the data to data for the general population, or for a demographic segment thereof, e.g., according to age, gender, etc., of the user. Such comparison, using the general population data as a baseline, can be used to evaluate a user mental state, e.g., a user may have a positive or negative mental state that could be quantified as a percentage worse or better than the general population. For example, speech at a speed within a particular range may indicate that the user is excited or agitated. Speech at a speed below a speed threshold may indicate that the user is relaxed. Speech in a monotone voice may indicate that the user is bored.

Additionally or alternatively, the server 16 may analyze the voice samples in comparison to one or more baseline samples of the user. For example, the server 16 may request a baseline voice sample from the user when the user is happy and another baseline sample when the user is angry, etc. The server 16 may analyze the current voice samples by comparing the samples to the one or more baseline samples.

Still further, the server 16 could, upon receiving a voice sample, ask the user to describe the user's mood. In this manner the server 16 could build a table of voice samples reflecting different user moods.

Body Data:

The user device 12 computer 32 may collect data related to the facial expressions, biometrics, body language, etc. related to the user. For example, the computer 32 may collect via a camera 30 or video recorder 30 included in or communicatively coupled with the user device 12, facial expressions of the user and body language of the user. The computer 32 may further collect, via, e.g., biometric sensors 30 as are known, biometric data such as heart rate, blood pressure, body temperature, pupil dilation, etc. related to the user. The computer 32 may collect the data on an on-going basis as the data is available. Additionally or alternatively, the computer 32 may for example, collect biometric data, visual data, etc. at a time when the user indicates that the user would like to select an item of media content. The computer 32 may provide the collected data, e.g., to the media server 16. The server 16 may analyze the data, and determine whether the body data indicates a particular mental state (e.g., mood), e.g., that the user is sad, angry, agitated, calm, sleepy, etc.

For example, using facial recognition techniques as are known, the server 16, may recognize that the user is smiling, or frowning, and determine respectively that the user is happy or sad. The server 16 may recognize that the user's eyes are opened widely, and determine that the user is surprised. The server 16 may determine, based on skin temperature, or skin color that the user is flushed, and further determine that the user is embarrassed.

The server 16 may further combine voice data, visual data and/or biometric data to more precisely identify the mood of the user. As discussed above, the voice data, visual data, biometric data, etc. may be collected and stored together with time stamps when the data was received (or generated). Data from a same or similar time period may be combined to identify a mood (or situation) of the user.

For example, high paced speech may indicate either that the user is angry or that the user is excited. Combining this data with facial data indicating that the user is smiling at a same time that the high paced speech is observed may assist the server 16 in accurately identifying that the user is excited. As another example, elevated blood pressure together with high pitched speech may be an indication that the user is frightened.

As described above, the computer 32 may collect what is sometimes referred to as document data, e.g., text files, audio files, video files, etc., related to the user's situation via the data collectors 30. For example, the computer 32 may determine a user's identity and/or location, etc., based on data from a camera and/or microphone 30.

Additionally, data from other sources may be used to determine the situation of the user. The data sources may include communications (emails, texts, conversations, etc.), documents (tax returns, income statements, etc.), global positioning (GPS) data, calendar or other scheduling application (past, present and future appointments, events, etc.), Internet browsing history, mobile purchases, input provided by the user, etc.

The server 16 may analyze the user's current situation based on events in the user's life (just completed a stressful meeting, planning to meet an old friend, a relative recently died, just received a raise, etc.), the user's company (people with the user), the user's location (the user's living room, in a hotel, etc.), the user's circumstances (financial status, age, religion, politics, etc.), and the day and time (year, month, week, weekday, weekend, holiday, user's birthday, birthday of the user's spouse, anniversary, morning, evening, etc.). The computer 32 may collect situation data related to the user, and determine the situation of the user based on the data.

Events:

The server 16 may identify past, present and future events related to the user. For example, based on data entered in, e.g., a calendar, the server 16 may determine that the user has a business trip scheduled for the following week. Based on email exchanges, the server 16 may determine that the business trip will require extensive preparation, and that the user will be travelling with his boss.

As another example, based on text messages, emails, and conversations, etc., the server 16 may determine that a relative of the user recently died.

Company:

The server 16 may determine, based on collected data other people who are with the user at a current time. For example, calendar data (email exchanges, text message exchanges, etc.) may indicate that the user is scheduled to meet with friends to watch a sporting event at the current time, or to meet with colleagues to discuss a business issue. Visual and audio data, collected by cameras 30 and microphones 30 may be used to identify people proximate to the user 30, using image recognition and audio recognition techniques, as are known. The server 16 may determine general demographic information about the people with the user such as their gender, approximate age, etc. Additionally or alternatively, the server 16 may identify specific people, and associate the specific people with stored data about the people. The stored data may indicate, for example, the situation of the people.

Location:

The server 16 may determine, based on collected data, a past, present or future location of the user. For example, the server 16 may, based on global positioning data, visual data, audio data, calendar data, etc., that the user is in the user's living room, in the user's office, in Hawaii, etc.

Circumstances:

The server 16 may determine, based on collected data, both long and short term circumstances related to the user. Circumstances may include age, gender, employment status, marital status, political views, religion, financial status, health status, place of residence, etc. For example, the server 16 may determine data related to financial status for documents such as electronic tax returns or W2 forms, or from communications such as emails, texts and conversations. Data related to internet browsing history may, e.g., provide an indication of political views or health status.

Day and Time:

The computer 32 may collect and provide, e.g., to the server 16, day and time data related to the user. For example, the computer 32 may determine, based on documents, communications, etc. important dates to the user such as the user's birthday, the birthday of the user's spouse, the user's anniversary, etc. The computer 32 may further determine, and provide to the server 16, routines of the user such as work schedule, times when the user is at home, days and times when the user attends a fitness center, etc. The server 16 may, based on this data, determine what a user is mostly likely doing at a particular time on a particular day of the week, date of the month, etc. Additionally, the server 16 may, for example, take into consideration that a religious holiday important to the user, or the birthday of the user will soon occur.

The server 16 may accumulate situation data related to the user on an on-going basis. The accumulated data 52 may be considered together with current data for determining the situation of the user.

Assigning Keywords to the User According to a Determined Mental State

The server 16 may assign or update keywords related to a user in response to a trigger event. For example, the server 16 may be programmed to assign or update keywords related to the user every evening at a particular time, such as 7 pm. The time may be selected, for example, to correspond to a time when the user generally watches television. The user may select the time via input to the server 16, or the server 16 may determine the time based on routines of the user.

As another example, the server 16 may receive a request from the user for updated situation keywords. For example, the user may input a request via the user device 12 for updated keywords, in preparation for selecting a movie to watch.

As yet another example, the server 16 may receive an indication, for example, from the media device 13, that the user has turned the media device 13 on, and is (apparently) planning to watch television.

Upon identifying a trigger event, server 16 may assign or update one or more keywords to the user. The keywords may be related to the user's mental state at a current time. The current time may be, for example, the time the trigger event is received, or within an hour before the trigger was received, etc.

The server 16 may assign, based on data related to the user, one or more keywords to a user selected from a list of predetermined keywords. The predetermined keywords may be single words such as "home", "travelling", "Republican", "married", etc., and/or phrases such as "preparing for a difficult task", or "going out with friends", "planning a trip", "relative died", etc. A set of predetermined keywords may be available to the server 16, which allow the server 16 to characterize a wide range of situations which may occur in the life of the user.

Based on the data collected, as described above, the server 16 may identify one or more keywords which describe a current situation of the user. For example, based on global positioning data, the server 16 may identify that the user is home. Based on data extracted from a calendar, the server 16 may know that the user just completed entertaining a client for two days. Based on the available data, the server 16 may assign a first keyword "home" and a second keyword "completed demanding task" to the user.

The server 16 may assign keywords to the user based on sets of sub-keywords or watchwords associated with each keyword. The watchwords may be single words or phrases. For example, the server 16 may associate a set of watchwords with each keyword. The set of watchwords for a particular keyword may contain any number of watchwords from just one or two watchwords to hundreds or even thousands of watchwords.

Further, while analyzing user mental state data, the server 16 may create a list of watchwords associated with the user. The watchwords may be, e.g., extracted from user communications, determined based on user physical conditions, or associated with the user based on the user location, people together with the user, demographics of the user, etc.

At a time, e.g., when the server 16 is triggered to assign keywords to the user, the server 16 may match the watchwords assigned to the user with the watchwords assigned to each keyword. The server 16 may then, assign the two keywords to the user with the highest number of matches between the watchwords assigned to the user and the watchwords assigned to the keyword.

For example, based on a sensor data, the server 16 may associate watchwords "flushed face", "clenched teeth" and "red face" with the user. The watchword "flushed face" may be included in the set of watchwords for both of the keywords "embarrassed" and "angry". The watchwords "clenched teeth" and "red face" may however, only be included in the set of watchwords for the keyword "angry". Because more watchwords are matched for "angry" than for "embarrassed", the server 16 may assign the keyword "angry" to the user. In some cases, for example, when there are an equal number of matches for two different keywords, the server 16 may ask the user to select a keyword. The question may ask the user to choose between two different keywords. For example, the server 16 may ask "Would you say that angry or embarrassed better describes your mental state at this time?"

Priorities may be assigned to different types of data when determining keywords. The data may be, for example, assigned a priority value in a range of from 1 to 100, with 100 being the highest priority. A death in the immediate family or being diagnosed with a serious illness may be assigned a value of 100. A change in employment situation or recently moving may be assigned a value of 75. A planned, routine business trip may be assigned a value of 54.

Further, the priority values may be determined based on when the event occurred (or is scheduled to occur) relative to the current time. For example, a death in the family that occurred within the last three months may have a priority value of 100. The priority value may be reduced slowly as time passes following the initial three months. With regard to a planned event, the priority value may increase as the event comes closer.

Other types of time-based algorithms may be used. For example, following the death of an immediate family member, this event may receive an increased priority value during holidays, and on the anniversary date of the event.

The user's company, i.e., the people with the user, may be given a high priority value. For example, when the user is together with the user's spouse, this may outweigh events related to the user, and be given a high priority value.

The server 16, based, e.g., on assigned priorities, determines data that may be most relevant to the current situation of the user. The server 16 then selects one or more situation keywords which may best describe the user. The server 16 may select the keywords by selecting the data (event, company, location, circumstances, time, etc.) with the highest priority values as described above, and selecting the predetermined keywords which best match the selected data. In some cases, the predetermined keyword may be a direct match with the data. For example, a set of predetermined keywords may include "death in the immediate family" which may directly match to high priority data related to the user.

In other cases, the server 16 may need to identify a keyword which best correlates to data related to the user. For example, several different types of situations, such as changing a job, moving to a new location, graduating from a school, etc. may all be associated with a situation keyword "major transition". In order to establish this correlation, the server 16 may, for example, be provided with a list of examples of events that qualify as a "major transition", and the server 16 may search for the event in the list. Additionally or alternatively, the server 16 may analyze the received data and determine a meaning as is known, and compare the meaning to a meaning of the situation keyword.

As stated above, the server 16 may assign, based on data collected concerning a user's physical state, one or more keywords to a user. Such predetermined keywords may indicate a user's mood, and may be words or expressions such as "joyful," "relieved," "sad," "excited," "overwhelmed," "at peace," "happily surprised," etc. A set of predetermined keywords may be available to the server 16, which allow the server 16 based on various possible detected physical attributes of a user.

For example, based on a recorded voice sample, the server 16 may measure the voice parameters such as rate of speech, pitch, contrast, volume, tone, etc. Speech at a high rate of speed, e.g., may indicate that the user is excited. Speech with a low contrast, i.e., in a monotone voice, may indicate that the user is bored. Sentences with an upward inflection at the end may indicate that user is feeling insecure.

The server 16 may further analyze data related to body language of the user. For example, visual data may indicate that the user is standing erectly with the head facing forward and determine that the user is feeling confident. The server 16 may analyze the user's face, detect tightness and determine that the user is feeling tense.

Still further, the server 16 may analyze biometric data such as the heart rate of the user or blood pressure of the user. A high pulse rate may indicate that the user is frightened or excited. A low pulse rate may indicate that the user is relaxed.

As discussed above, the server 16 may consider a combination of voice data, visual data and biometric data to determine a user's mental state. For example, a high pitched voice, combined with a high pulse rate and a smile detected on the user's face may indicate that the user is "happily surprised." Also as discussed above, the server 16 may use time stamps associated with the voice, visual and biometric data in order to combine data associated with a particular time.

Different types of data may be given higher priority than other types of data. For example, facial expressions, such as a smile or frown may be strong indications of a particular mood, whereas voice data or biometric data may be associated with multiple moods. In such cases, a facial expression which is a strong indicator of a particular mood may be given priority over the voice and biometric data. In other cases, for example, a particular facial expression may be indicative of two or more possible moods. Voice and biometric data may be used in order to select between the possible moods.

Current data, for example, voice samples or visual data from the previous five minutes, may be given priority over data which is older.

Based on the visual data, voice data and biometric data related to the user, the server 16 may assign one or more mood keywords to the user which may best characterize the mood of the user at the current time.

Assigning a Complementary Keywords to the User

As described above, the server 16 may assign one or more keywords to the user at a current time. In some cases, however, the server 16 may wish to exchange an assigned keyword with a complementary keyword prior to using the keywords for selecting a media content item. This may particularly be the case when the keyword indicates a strong mental state, e.g., very sad, very happy, highly valued, etc.

For example, when a user is experiencing a negative mental state such as depression, loneliness, anger, fear, etc., the user may wish to view media content which is uplifting and cheerful. Accordingly, the server 16, when it determines that the user may be experiencing a negative mental state, may assign a mood keyword describing a type of media content which will encourage the user. Similarly, when the user is feeling a positive mental state such as joy, happiness, gratitude, encouraged, valued, loved, capable, etc., the user may wish to engage in more challenging entertainment, and watch a serious movie about social injustice. Accordingly, the server 16, when it determines that the user may be experiencing a positive mental state, may assign a mood keyword describing a type of media content which will challenge the user.

Selecting a Media Content Item Based on Assigned Keywords

Based on the one or more situation keywords and one or more mood keywords assigned to the user, the server 16 may further select one or more media content items to recommend and/or provide to the user.

As one example algorithm, the server 16 may compare keywords assigned to the user with keywords assigned to the media content item, e.g., a media content item may include metadata specifying one or more keywords. The server 16 may prepare a list of media content items to recommend to the user based on a number of matches found between the user keywords and the media content item keywords.

For example, the server 16 may assign one mood keyword and two situation keywords to the user. The server 16 may give a highest ranking to media content items which have keywords matching all three of the keywords assigned to the user. The server 16 may give a second highest ranking to media content items which have a matching mood keyword, and one matching situation keyword. The server 16 may give a third highest ranking to a media content item having two matching situation keywords, and not having a matching mood keyword, etc.

As another example, the server 16 may rank media content items based on the ratings the media content items received from other users which had been assigned the same set of keywords. As described below, the server 16 may receive a rating from users following the viewing of a media content item. The server 16 may store the rating, along with keywords assigned to the user, and the media content item which was viewed by the user. In this way, the server 16 can recommend media content items which received high ratings from other users when they were assigned the same set of keywords.

Additional or alternative criteria may be used, together with the keyword data, to select media content to recommend or provide to the user. For example, when applying ratings to combinations of keywords and media content, the server 16 may only consider other users identified as friends of the user, or may only consider other users that viewed the media content item within a predetermined period of time of the current time, etc.

Upon determining a ranking of media content items to recommend or provide to the user, the server 16 may present a list of the media content items to the user. The media content items with the highest ranking may appear at the top of the list, and media content items with lower rankings may appear lower in the list. The server 16 may transmit the list to the user via, e.g., the user device 12 or the media device 13. The user may select a media content item for view, and send a request for the media content item to the server 16. The server 16 may, e.g., stream the media content item to the media device 13.

The server 16 may further present a list of media content viewed by friends while having been assigned the same set of keywords, or, e.g., at least one of the same keywords. The list may be arranged in chronological order, and indicate the media content viewed by the friend, together with the name of the friend, and if available, the rating provided the friend.

Alternatively, the server 16 may select a media content item, for example the media content item at the top of the list, and present the media content item to the user via a computing device such as the user device 12 or the media device 13.

In addition to recommending and/or providing media content based on the keywords assigned to the user, the server 16 may also identify other users that currently or recently (e.g., within the last week), have been assigned the same set of keywords. The server 16 may, e.g., prioritize friends of the user. In this manner, the user may contact the other user with the same set of keywords, and ask, e.g., for a recommendation for media content, or otherwise strike up a conversation.

Ranking a Media Content Item

As described above, during, or after providing the media content item to the user, the server 16 may receive a rating of the media content item from the user. For example, the server 16 may send a request, via the user device 12, or via the media device 13, for the user to rate the media content item. The rating may be, for example, a numerical value between zero and five, with five being the highest rating and zero being the lowest rating. Based on the request, the user may provide the rating, using for example, the user interface 36 on the user device 12, or the user interface 46 on the media device 13.

The server 16 may store the rating received from the user, along with the identity of the media content item, and the keywords assigned to the user at the time the media content item was provided. In this manner, the server 16 can develop statistical data indicating the responses of users with a particular set of keywords, to a particular media content item.

Additionally, the user may create new keywords and associate the new keywords with the media content item. For example, the user, in addition to assigning a rating of five out of five to a media content item, the user may describe the media content with the keywords "life-changing", "drama", "thriller" and "cerebral". In the case that the keyword "life-changing" had not already been assigned to the media content item, the server 16 may add this keyword. The server 16 may further associate the watchwords associated with the user, e.g., at the time of the rating, to the keyword "life-changing". The list of watchwords associated with the keyword "life-changing" will grow by association, as other users are then, assigned the keyword "life-changing", or otherwise participate in the conversation around the media content item.

Example Process

Figure 4A:
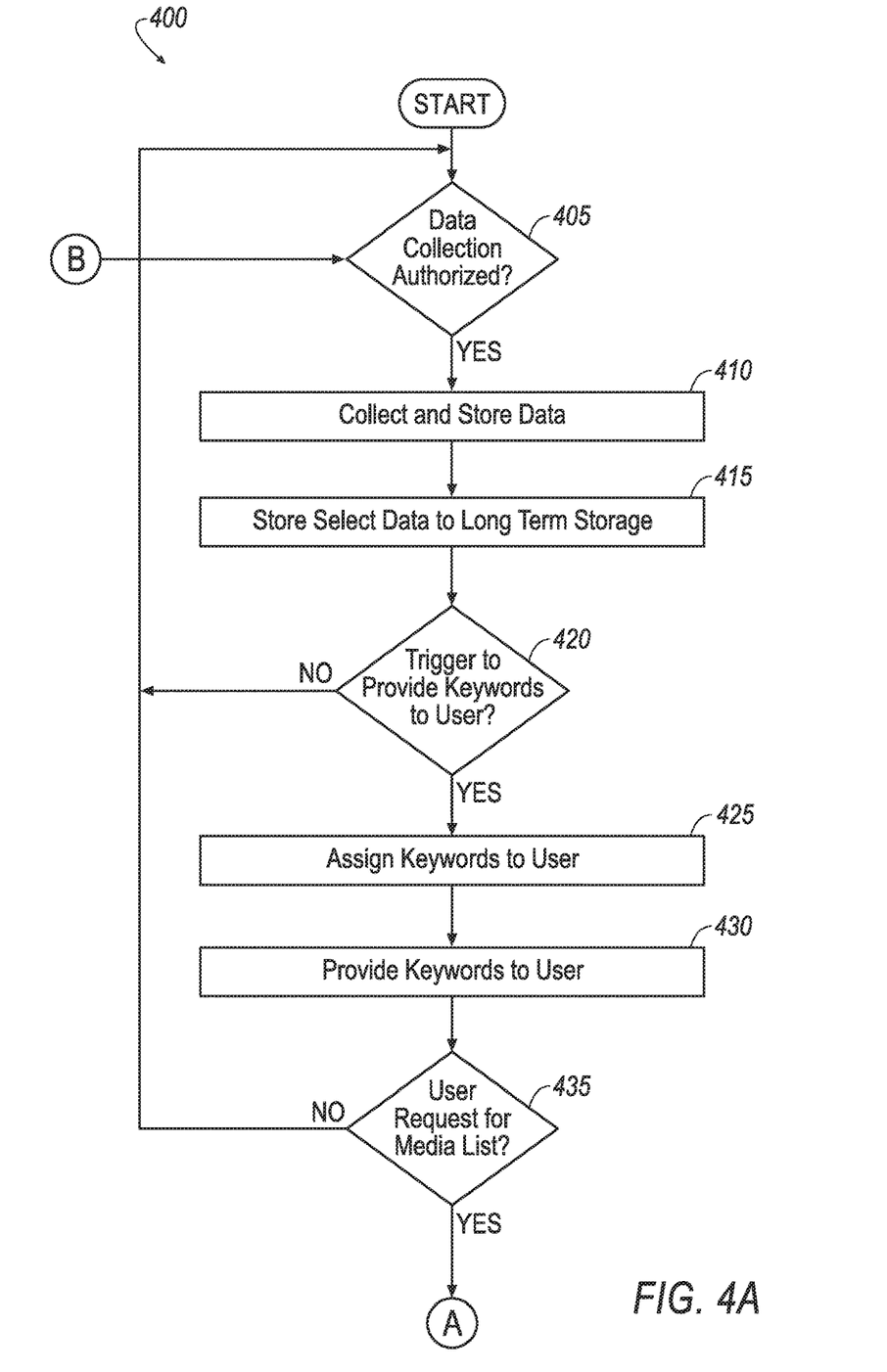
FIGS. 4A and 4B are a diagram of an exemplary process for providing media content based on a user state.
Figure 4B:
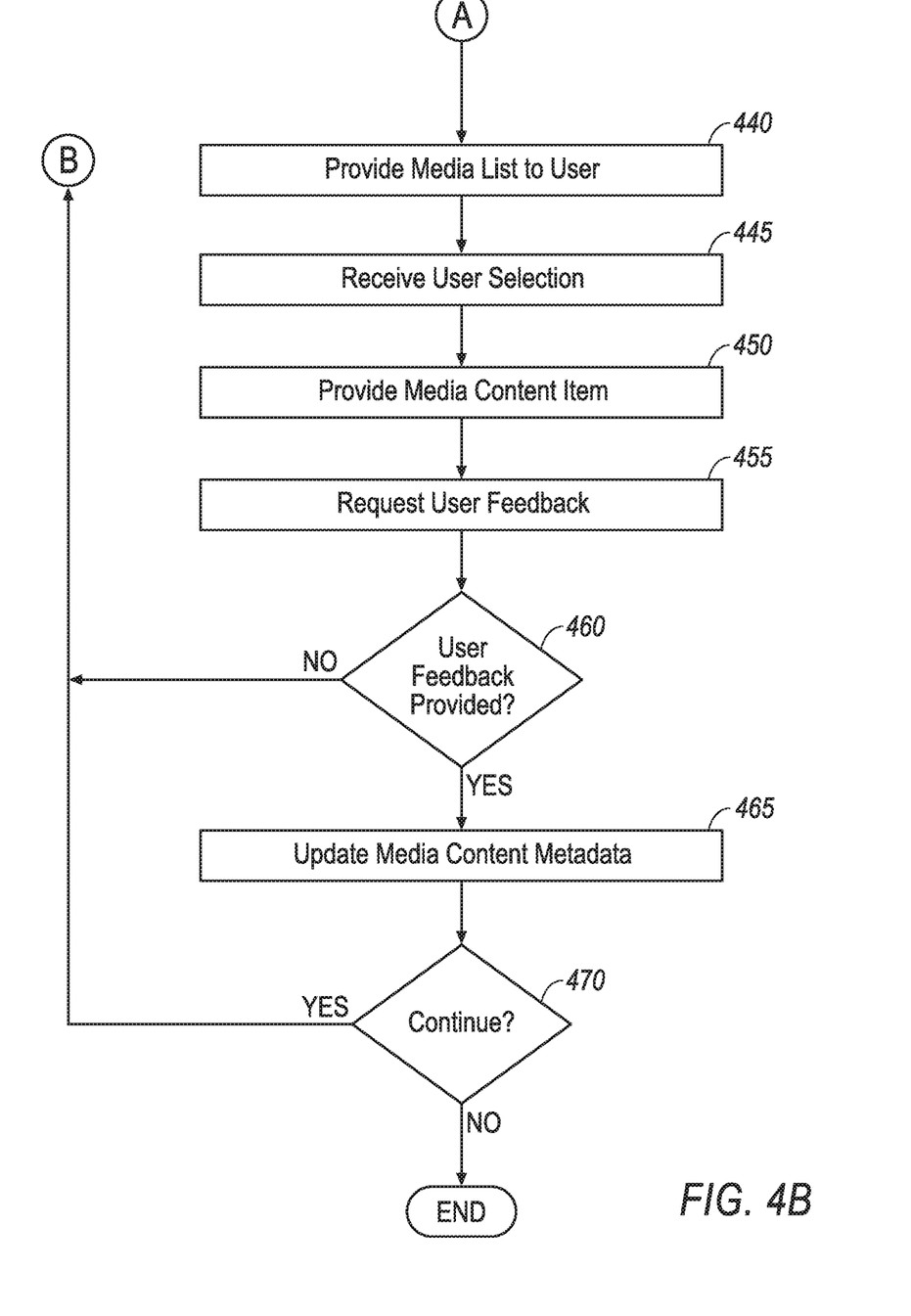

FIGS. 4A and 4B are a diagram of an exemplary process 400 for providing media content to a user based on a user mental state. The process 400 begins in a block 405.

In the block 405, a computer 32 in the user device 12 determines if the computer 32 is authorized to collect data related to the user. For example, the computer 32 may have previously received and stored authorization from the user. The user may have, e.g., authorized the computer 32 to collect all available data. Alternatively, the user may have restricted the types of data which may be collected (only email data, only voice data, all types of data except voice data, etc.), or the times and/or situations when data may be collected (at particular times of the day, when the user is watching media content, when the user is at home, etc.). The authorization may have been input by the user and stored by the user device 12.

The user device 12 may query the stored data from time-to-time to determine authorization. In the case that the user device 12 is not authorized to collect data, the process continues in the block 405. In the case that the user device 12 has received authorization from the user, the process 400 continues in a block 410.

In the block 410, as described above, the computer 32 of user device 12 collects data related to the user. The computer 32 may collect data such as audio data, visual data and biometric data from data collectors 30. Additionally, the computer 32 may collect data related to the user from other sources. The data sources may include, e.g., communications (emails, texts, conversations, etc.), documents (tax returns, income statements, etc.), global positioning data (GPS), calendar or other scheduling application (past, present and future appointments, events, etc.), internet browsing history, mobile purchases, input provided by the user, etc.

The computer 32 may provide the collected data to another computing device such as the media server 16.

Additionally, other computing devices, such as the media device 13 may collect data. For example, the computer 42 of the media device 13 may collect data related to the user, via data collectors 40. The computer 42 may provide the collected data, e.g., to the server 16 of media server 16.

Upon receipt of the data by the server 16, the process 400 continues in a block 415.

In the block 415, the server 16 (or a computer communicatively coupled to the server 16 such as the computer 32) may sort the data as short term data and long term data. Short term data may be data that is determined not to have a long term impact on the mood or situation of the user. For example, data indicating that the user followed a regular routine and met a colleague for lunch may be considered as short term data which does not have long term significance. Data indicating that the user is expecting a child may be considered to be data that has long term significance. The short term data may be stored for a short period of time, e.g., 24 hours. The long term data may be added to long term data storage, where it is stored, for example, indefinitely.

Additionally or alternatively, as described above, a time stamp may be associated with some or all of the stored data. Based on the type of data, the weighting of the data when determining the mood and the situation of the user may be adjusted as time passes. After storing the data, the process 400 continues in a block 420.

In the block 420, the server 16 determines if a trigger event has occurred to provide keywords to the user. As described above, the server 16 may be programmed to assign or update keywords related to the user every evening at a particular time, such as 7 pm.

Additionally or alternatively, the server 16 may receive a request from the user for updated keywords. For example, the user may input a request via the user device 12 for updated keywords, in preparation for selecting, e.g., a movie to watch.

As another example, the server 16 may receive an indication, for example, from the media device 13, that the user has turned the media device 13 on, and infer that the user is planning to watch television. The server 16 may recognize the turning on of the media device 13 as a trigger to provide keywords to the user.

In the case that the server 16 recognizes a trigger event, the process 400 continues in a block 425. In the case that the server 16 does not recognize a trigger event, the process 400 continues in the block 405.

In the block 425, the server 16 assigns, as described above, one or more situation and/or mood keywords to the user. The server 16 may select situation and mood keywords from sets of predetermined situation and mood keywords, based on data related to the user. In some cases, as described above, when for example the selected keywords associated with the user indicate strong feelings, complementary mood keywords may be exchanged for the originally selected keywords. The process 400 continues in a block 430.

In the block 430, the server 16 may provide the assigned keywords to the user. For example, the server 16 may transmit the keywords to the user device 12 computer 32, and instruct the computer 32 to display the keywords on the user interface 36. As another example, the server 16 may transmit the keywords to the media device 13 computer 42 and instruct the computer 42 to display the keywords on the user interface 46. The process 400 continues in a block 435.

In the block 435, the server 16 determines whether the user has requested a recommended list of media content. For example, the user may, in response to receiving the assigned keywords, request, via the user device 12 computer 32 to the media provider 16 server 16, a list of recommended content based on the keywords assigned to the user. Alternatively, the server 16 may receive, for example, a request for an electronic programming guide (EPG) from the media device 13. In the case that the server 16 receives (or otherwise identifies) a request for a recommended list of media content, the process 400 continues in a block 440. Otherwise, the process 400 continues in the block 405.

In the block 440, the server 16 provides a list of recommended media content to the user via, e.g., the user device 12 computer 32, or the media device 13 computer 42. The media content may be ranked based on the keywords assigned to the user and the keywords assigned to each media content item, as described above. The process 400 continues in a block 445.

In the block 445, the server 16 receives a selection for a media content item from the user. The selection may be received, for example, via the user interface 36 of the user device 12, or the user interface 46 of the media device 13. The process 400 continues in a block 450.

In the block 450, the server 16 provides the media content to the user. For example, the server 16 may stream the media content to the media device 13 computer 42. The process 400 continues in a block 455.

In the block 455, the server 16 may request feedback from the user regarding the media content. For example, during, or upon finishing the streaming of the media content item, the server 16 may send a request to the user, via the user device 12 computer 32, requesting that the user rate the media content item. The process 400 continues in a block 460.

In the block 460, the server 16 determines whether the server 16 has received feedback from the user. In the case that the server 16 has received feedback, the process 400 continues in a block 465. In the case, for example, that after waiting a predetermined time from the request for data, the server 16 does not receive feedback, the process 400 continues in a block 405. The predetermined time may be, e.g., 10 minutes.

In the block 465, the server 16 updates metadata related to the media content item. For example, the metadata may include a rating of the media content item based on other users that had the same assigned keywords when viewing the media content item. The server 16 may update the keyword specific rating to take into account the rating from the user that provided the feedback. As another example, the metadata may include a rating of the media content item based on other users that had the same mood keyword as the user and are indicated to be friends of the user.

Upon updating the metadata associated with the media content item, the process 400 continues in a block 470.

In the block 470, the server 16 determines whether the process 400 should continue. For example, the server 16 may be programmed to continue to receive data related to the user from the user device 12 on an on-going basis. In this case, the process 400 may continue in the block 405. Additionally or alternatively, the server 16 may ask the user, e.g., via the user device 12, to confirm that the process 400 should continue. In the case that the server 16 receives confirmation, the process 400 may continue in the block 405. Otherwise, the process 400 may end. The server 16 may, for example, send an instruction to the user device 12 computer 32, to discontinue collecting data, or, may discontinue receiving data from the user device 12. In this case, the process 400 ends.

The descriptions of operations performed by the one or more user devices 12, one or more media devices 13, and the media server 16 are exemplary and non-limiting. The one or more user devices 12, one or more media devices 13, and media server 16 are communicatively coupled computing devices. Accordingly, computing operations may be distributed between them. Operations such as collecting data, selecting data to be stored, assigning keywords to a user, comparing user keywords to media content keywords, may be performed in any one of the computing devices, or distributed over any combination of the computing devices.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
    a computing device including a processor and a memory, the memory storing instructions executable by the processor such that the processor is programmed to:
        receive a plurality of user communications associated with a user over a period of time;
        extract, from the plurality of user communications, a plurality of watchwords, such that the plurality of watchwords is associated over the period of time with the user;
        detect a predetermined trigger event separate from the user communications;
        assign a set of stored keywords to the user, responsive to detecting the predetermined trigger event, by identifying one or more matches between the plurality of watchwords associated with the user and a plurality of stored keywords previously associated with the user, the plurality of stored keywords comprising the set of stored keywords, such that at least a first of the assigned set of stored keywords indicates a present user situation and at least a second of the assigned set of stored keywords indicates a present user physical condition; and
        provide media content responsive to detecting the trigger condition based at least in part on the one or more keywords assigned to the user.

2. The system of claim 1, wherein the processor is further programmed to:
    assign at least one keyword to the user related to the present user physical condition to the user based at least in part on an analysis of mental state data from at least one of a voice communication, an email, a text message, an event on a user calendar, user transaction records, and user on-line browsing history.

3. The system of claim 2, wherein the mental state data is received from a second computing device associated with the user.

4. The system of claim 3, wherein the second computing device includes one of a mobile telephone, a tablet and a smart wearable device.

5. The system of claim 2, wherein the mental state data further includes user location data.

6. The system of claim 2, wherein the mental state data further includes data indicating other people proximate to the user.

7. The system of claim 2, wherein the mental state data further includes user demographic data.

8. The system of claim 2, wherein the processor is further programmed to:
    receive metadata including keywords related respectively to one or more items of media content available to the user; and
    compare the one or more keywords assigned to the user with the keywords related respectively to the one or more items of media content, wherein providing the media content to the user is based at least in part on the comparison.

9. The system of claim 8, wherein the processor is further programmed to:
    recommend, based on the comparison, one or more media content items to the user; and
    receive an input from the user selecting one of the one or more recommended media content items, wherein, providing the media content is based on the selection.

10. The system of claim 2, wherein the mental state data includes at least one of audio data related to the user, visual data related to the user and biometric data related to the user.

11. The system of claim 1, wherein at least one of the assigned set of stored keywords is assigned to the user is based at least in part on an analysis of the voice of the user.

12. The system of claim 1, wherein at least one of the assigned set of stored keywords is assigned to the user is based at least in part on an analysis of the body language of the user.

13. The system of claim 1, wherein the processor is further programmed to:
    ask the user, via an interface, a question;
    receive an answer via an audio sensor; and
    at least one of the assigned set of stored keywords is assigned to the user based at least in part on a response to the question.

14. The system of claim 1, wherein the processor is further programmed to:
    generate, prior to providing the media content to the user, one or more additional keywords related to the present user physical condition as predetermined complementary keywords to the at least the second of the assigned set of stored keywords.

15. The system of claim 14, wherein the at least the second of the assigned set of stored keywords is associated with a negative mental state, and the one or more additional keywords is associated with a positive mental state.

16. The system of claim 1, wherein the processor is further programmed to:
    receive a numerical rating of the media content item from the user;
    store the numerical rating, together with the set of stored keywords assigned to the user; and generate a ranking of the media content item relative to other media content items, taking into account the numerical rating together with the keywords assigned to the user.

17. The system of claim 1, wherein the processor is further programmed to:
receive a keyword attributed by the user to the media content item; and
include the keyword in metadata associated with the media content item.

18. The system of claim 1, further comprising:
a plurality of data collectors in communication with the processor,
wherein a first of the plurality of data collectors is to collect at least a portion of the data indicating the present user situation and to provide the portion of the data indicating the present user situation to the processor, and
wherein a second of the plurality of data collectors is to collect at least a portion of the data indicating the present user physical condition and to provide the portion of the data indicating the present user physical condition to the processor.

19. The system of claim 1, further comprising a second processor programmed to:
receive a recommendation for media content items from the processor;
display the recommendation to the user;
receive an input from the user selecting media content; and
transmit the input to the first processor.

20. A method comprising:
receiving, by a processor, a plurality of user communications associated with a user over a period of time;
extracting, from the plurality of user communications, a plurality of watchwords, such that the plurality of watchwords is associated over the period of time with the user;
detecting a predetermined trigger event separate from the user communications;
assigning a set of stored keywords to the user, responsive to detecting the predetermined trigger event, by identifying one or more matches between the plurality of watchwords associated with the user and a plurality of stored keywords previously associated with the user, the plurality of stored keywords comprising the set of stored keywords, such that at least a first of the assigned set of stored keywords indicates a present user situation and at least a second of the assigned set of stored keywords indicates a present user physical condition; and
providing media content to the user responsive to detecting the trigger condition based at least in part on the keywords assigned to the user.

21. The method of claim 20, wherein:
at least the first of the assigned set of stored keywords corresponds to a first portion of the plurality of watchwords extracted from first interactions between the user and at least a first of a plurality of data collectors, and
at least the second of the assigned set of stored keywords corresponds to a second portion of the plurality of watchwords extracted from second interactions between the user and at least a second of a plurality of data collectors.

* * * * *